United States Patent
Rasmussen

(10) Patent No.: US 6,637,373 B2
(45) Date of Patent: Oct. 28, 2003

(54) NESTING BOX

(76) Inventor: Søren Rasmussen, Skoleholdervej 75, 1.th., Copenhagen NV (DK), 2400

(*) Notice: Subject to any disclaimer, the term of this patent is extended or adjusted under 35 U.S.C. 154(b) by 0 days.

(21) Appl. No.: 10/083,140

(22) Filed: Feb. 27, 2002

(65) Prior Publication Data

US 2002/0174836 A1 Nov. 28, 2002

Related U.S. Application Data

(63) Continuation of application No. PCT/DK00/00463, filed on Aug. 21, 2000.

(30) Foreign Application Priority Data

Aug. 31, 1999 (DK) .......................................... 1999 01163

(51) Int. Cl.[7] .............................................. A01K 31/08
(52) U.S. Cl. ........................ 119/431; 119/433; 119/428
(58) Field of Search ................. 119/431, 432, 119/428, 433, 435; 229/103, 120; 428/577

(56) References Cited

U.S. PATENT DOCUMENTS

| | | | | |
|---|---|---|---|---|
| 1,791,956 A | * | 2/1931 | Cowles | 119/431 |
| 1,911,702 A | * | 5/1933 | Mallgraf | 119/431 |
| 2,666,414 A | * | 1/1954 | Burr et al. | 119/431 |
| 3,244,145 A | | 4/1966 | Braunhut | 119/269 |
| 3,250,249 A | * | 5/1966 | Nelson et al. | 119/431 |
| 3,977,592 A | * | 8/1976 | Gorham | 229/120.18 |
| 4,033,296 A | * | 7/1977 | Cudmore | 119/428 |
| 4,209,937 A | * | 7/1980 | Witte | 446/63 |
| 4,471,721 A | * | 9/1984 | Vail | 119/428 |
| 4,712,673 A | * | 12/1987 | Moore | 206/232 |
| 4,889,075 A | * | 12/1989 | Byrns | 119/435 |
| 5,134,970 A | | 8/1992 | Oh | 119/23 |
| 5,255,841 A | * | 10/1993 | Ritter | 229/103 |
| 5,746,156 A | | 5/1998 | Petrides et al. | 119/428 |
| 6,311,643 B1 | * | 11/2001 | Christian et al. | 119/431 |
| 6,386,440 B1 | * | 5/2002 | Tulkoff | 229/120.32 |
| 2001/0004088 A1 | * | 6/2001 | Lau | 229/117.15 |

FOREIGN PATENT DOCUMENTS

| | | |
|---|---|---|
| DE | 7132611 | 4/1972 |
| GB | 2 054 523 | 2/1981 |
| SE | 128 444 | 6/1950 |
| SE | 128 445 | 6/1950 |

* cited by examiner

Primary Examiner—Peter M. Poon
Assistant Examiner—Joan M. Olszewski
(74) Attorney, Agent, or Firm—Winston & Strawn LLP

(57) ABSTRACT

The invention relates to a punched out sheet for use in making a bird-nesting box without using tools or other aids and to a bird nesting box made from the same. The sheet has an interconnected outer part and an inner punch-out part. The outersheet has a carrier handle and devices for adjustment and reinforcement of the entrance and exit hole of the box. The inner part has bipartite suspension devices, a surface device in the form of a ladder and a transverse device in the form of a guard against predators.

16 Claims, 4 Drawing Sheets

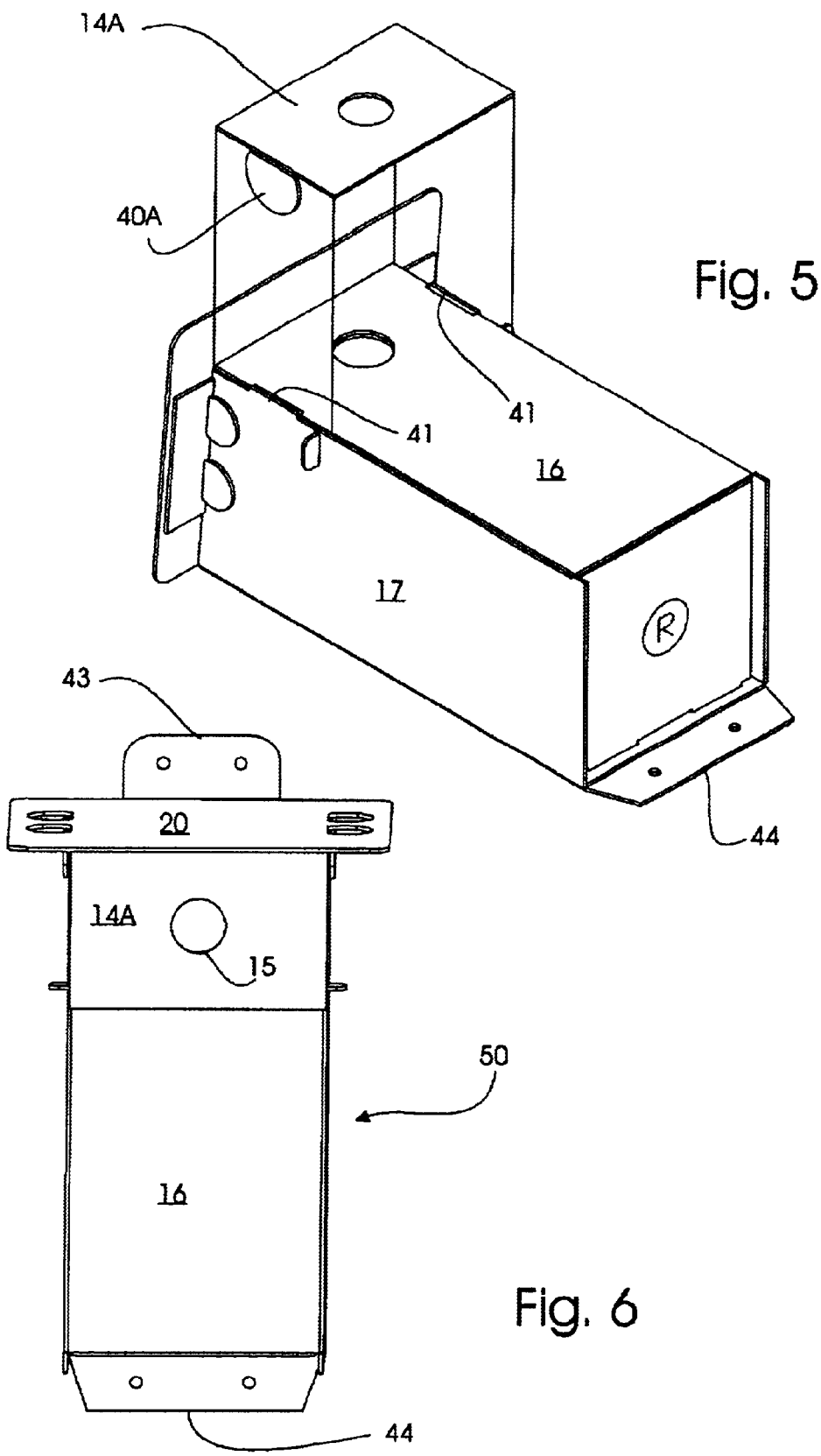

NESTING BOX

CROSS-REFERENCE TO RELATED APPLICATIONS

This application is a continuation of the U.S. national stage designation of International application PCT/DK00/00463 filed Aug. 21, 2000, the entire content of which is expressly incorporated herein by reference thereto.

BACKGROUND ART

The present invention relates to a punch-out sheet for use in making bird nesting boxes without using tools or other aids for such nesting boxes.

The boxes are intended as nesting, brooding, resting and residential facilities for wild and domesticated birds.

Bird nesting boxes made of punch-out sheets are already generally known in prior art, see, e.g., Swedish patent No. 128445. However, a number of important details have not been taken into account in the manufacture of these boxes. The punch-out sheets are not designed for easy handling. The sizes of the entrance and exit hole of the boxes cannot be adjusted, and the access to the boxes through the hole is not guarded or secured against any predators. Nor do the prior art boxes contain any type of devices that can help the nestlings of the birds leave the boxes when they are fledged.

Thus, there is a need to remedy the disadvantages of prior-art bird nesting boxes, and this need is met by the present invention.

SUMMARY OF THE INVENTION

The present invention is directed to a bird nesting box that is made from a punch-out sheet that includes an interconnected outer and inner sheet, where the outer sheet has a carrier handle and up to several devices for adjustment and reinforcement of the entrance and exit hole of the boxes, and the inner sheet has an integral, at least bipartite, suspension system and a surface device in the form of a ladder intended for arrangement on the internal back wall of the box and a transverse device in the form of a guard against predators intended for arrangement under the entrance and exit hole.

BRIEF DESCRIPTION OF THE DRAWING FIGURES

FIGS. 3 to 5 show how the nesting box of the invention is folded and assembled;

FIGS. 6 to 7 illustrate the final assembled nesting box by front and perspective views, respectively.

DETAILED DESCRIPTION OF THE PREFERRED EMBODIMENTS

Figure 1:
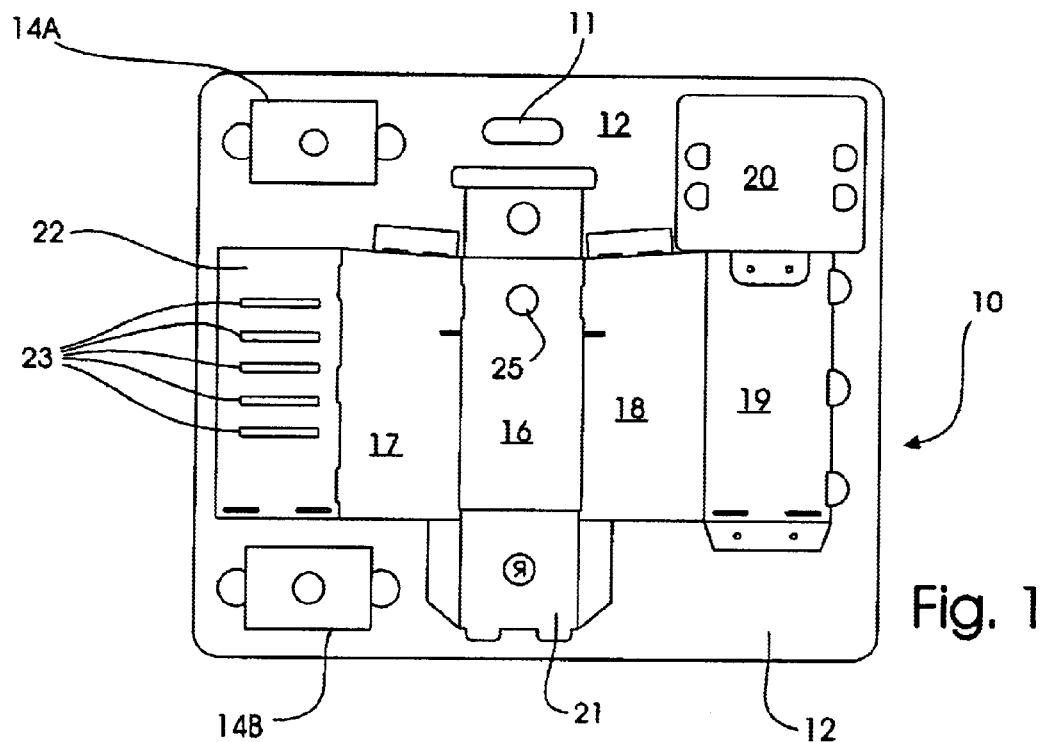
FIG. 1 is a view of the entire punch-out sheet of the invention which shows its components.

The punch-out sheet is generally made of plastic, synthetic materials, cardboard/paper compsotions, plant fibres or combinations of these materials. The punch-out sheets are preferably made of howwow-structure sheet polypropylene.

The bird nesting box according to the present invention is characterised in that it is made by folding and assembling at least the inner sheet from the punch-out sheets.

The bird nesting box is used in all contexts where wild and domesticated birds need or use nesting boxes.

In the prior-art nesting boxes of this type, such boxes are also sometimes folded and assembled from punch-out sheets or sheets made by the use of other technology, but nesting boxes of this type have not at one and the same time addressed the following aspects:

(1) that the punch-out sheet which is the basis of the nesting box is contained in a outer punch-out sheet with a carrier handle and devices for adjustment and/or retention and reinforcement of the entrance/exit hole diameter of the nesting box, (2) that the diameter of the entrance/exit hole of the nesting box can be adjusted and/or retained and reinforced with devices contained in an outer punch-out sheet, (3) that the nesting box has an inherent, at least bipartite or dual, suspension system contained in the punch-out sheet that is the basis of the nesting box, (4) that the nesting box in its assembled state has inside surface devices (or "ladder") opposite to the side of the entrance/exit hole which helps not fully fledged nestlings leave the nest box, (5) that the nesting boxes in an assembled state have an internal transverse device under the entrance/exit hole ("squirrel barrier") as a guard against predators, (6) that nesting boxes can withstand boiling water at cleaning, (7) that the nesting boxes can withstand cleaning with all known household cleaning agents, (8) that the nesting boxes can withstand strong frost, strong heat and solar influence (UV radiation) without rapidly becoming destroyed, (9) that the nesting boxes can easily be opened and reclosed after, e.g., cleaning without the use of tools and aids,

(10) that the nesting box can be dyed (color-fast) in all colors (e.g., the entire RAL color scale),

(11) that the nesting boxes have excellent insulation properties, good ventilation and relevant draining devices at one and the same time,

(12) that, due to low net weight and design in general, the nesting boxes can easily/cheaply be handled at mailing/shipping in general in a non-folded/non-assembled state,

(13) that many (e.g., more than 50) nesting boxes can easily be manually transported ever great distances in a non-folded/non-assembled state,

(14) that the nesting boxes are made of such materials that considerations of the environment and degradability/composting in the environment are optimised on the basis of current international environmental agreements, conventions, legislation for the use of industrially manufactured products in and around the nature.

The nesting box of the invention provides a box that appears as a bird nesting box in the conventional meaning in all substantial aspects.

The novelties of the invention are that the nesting box can easily be shipped and transported (also manually) even over large distances, and that the nesting box can easily be folded and assembled without the use of tools or other assembly aids on the basis of the components of an outer and an inner punch-out sheet, also at the actual place of suspension, and is easily suspended without the use of tools. Also, the nesting box can easily be cleaned at the place of suspension (trees, bushes, buildings, etc.) and easily be destroyed or recycled when its useful life is completed.

Through chosen designs and based on existing research as well as practical experience in the field, the invention has solved the problems of providing nesting boxes in which birds including any offspring obtain adequate protection/cover and shelter from predators, weather and wind, in combination with the fact that the invention is easy to: ship/transport, assemble, suspend, clean, replace and destroy/recycle. Furthermore, through its designs the invention ensures that birds and any offspring can easily get in and out of the nesting box, in combination with the fact that the invention seeks to secure birds and their offspring against predators ("squirrel barrier").

FIG. 1 shows:

The inner and outer interconnected punch-out sheets 10 and their components carried in the so-called carrier handle 11; outer punch-out sheet 12; inner punch-out sheet 13; and cut-out members 14A, 14B for reinforcing the entrance-exit hole 15. The inner punch-out sheet represents the main portion of the nesting box, and includes front portion 16, side portions 17, 18, outer back portion 19, lid portion 20 and floor portion 21. These portions include various slots and tabs that enable to box to be assembled. Also, the rear inner wall portion 22 includes a plurality of horizontal cut-outs 23 which when the box is assembled create steps that assist in allowing fledglings to exit the nesting box.

Figure 2:
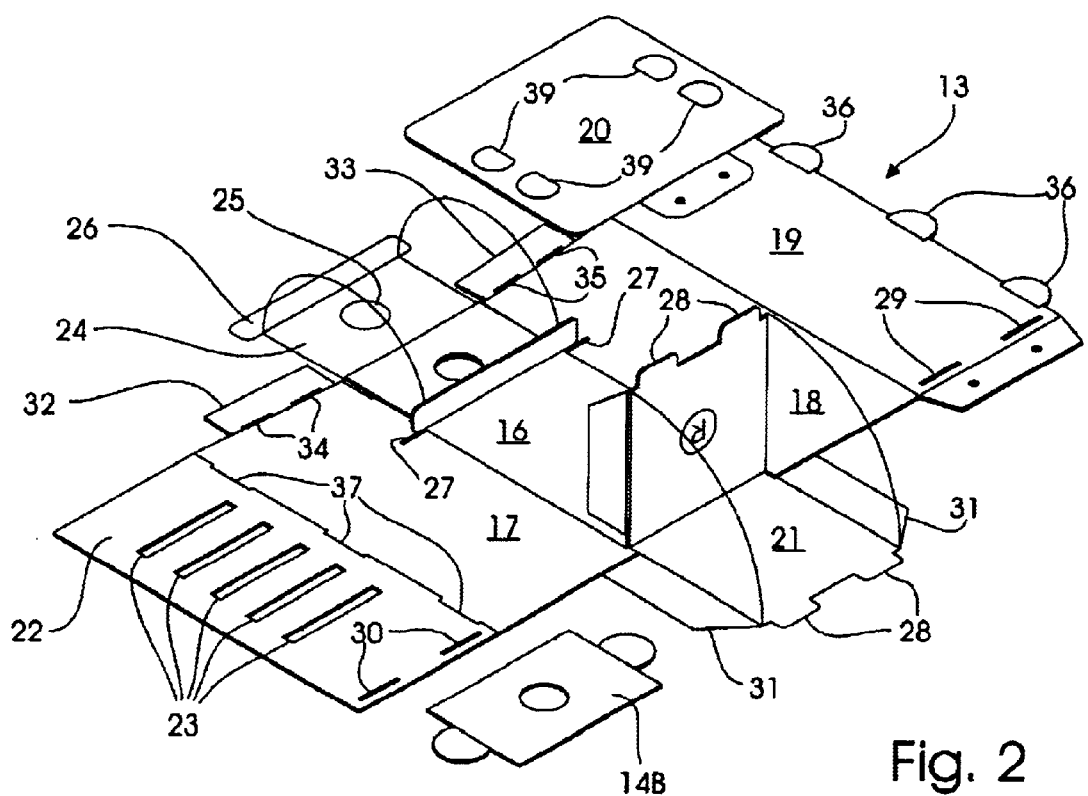
FIG. 2 is a view of the inner punch-out sheet with the outer sheet removed.

FIG. 2 illustrates the inner punch-out sheet 13 in position for assembly of the box. The front portion 16 includes the entrance/exit hole 15, and an extension 24 that has a hole 25 that corresponds to the entrance/exit hole 15. As shown, the extension 24 is being folded over the inner side of the front portion 16 with the holes 15, 25 in alignment. In addition to reinforcing the entrance/exit hole 15, extension 24 also includes a squirrel barrier 26 that makes it more difficult for squirrels to enter the nesting box. The ends of this barrier 26 are held in slots 27 and this arrangement maintains the barrier 26 in its operative position.

Figure 4:
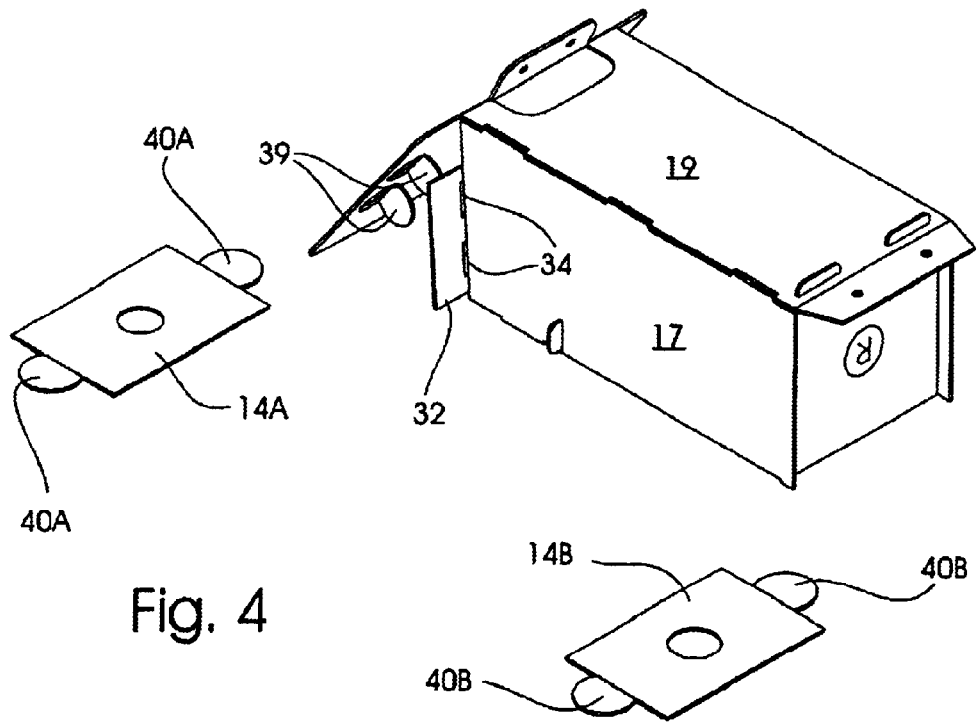

FIG. 2 also shows tabs 28 on floor portion 21 and slots 29 for fastening and closing the outer back portion 19 of the nesting box through slots 30 on rear inner wall portion 22 to the floor portion 21. Side flaps 31 of the floor 21 abut against side wall portions 17, 18 and prevent a space from opening between side wall portions 17, 18 and floor 21. Side wall portions 17, 18 each include extensions 32, 33, which includes cut-outs 34, 35, respectively. Lid portion 20 includes tabs 32 which are used for closing/opening the nesting box lid by being pressed down into the cut-outs 34, 35 of side wall portions 16, 17. FIG. 4 illustrates these tabs in position for engagement of the cut-outs of the side wall portions.

Figure 3:
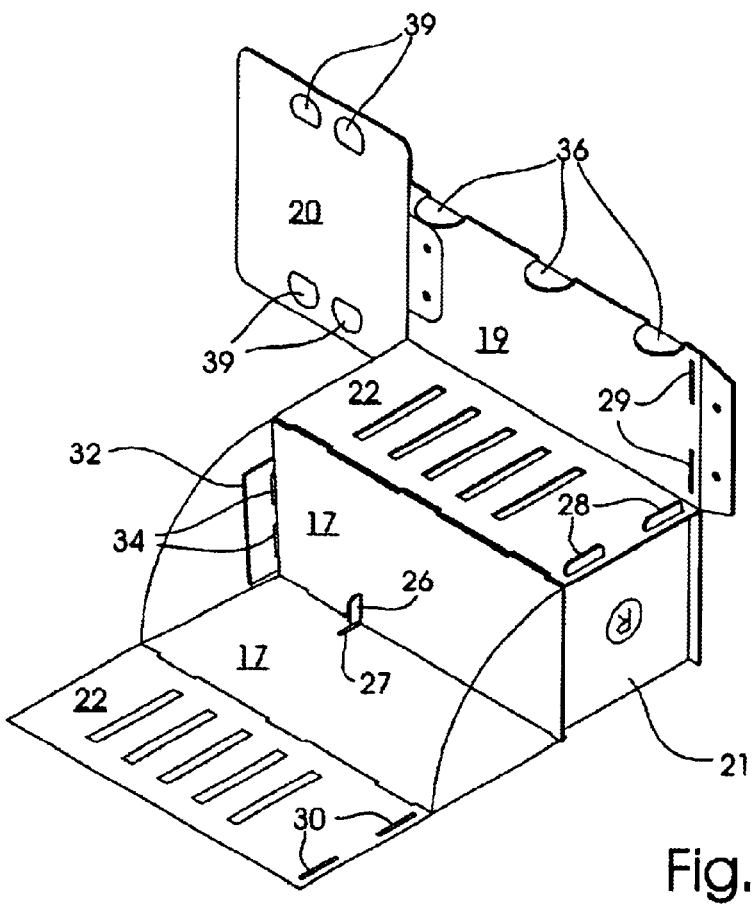

FIG. 3 illustrates the partial formation of the nesting box after one sidewall portion 18 is folded to stand vertically, with rear outer portion 19 also being in a vertical position. To complete the assembly of the box, side wall portion 17 is folded vertically upwards, rear inner wall portion 22 is folded to span the open space between the side walls 17, 18 and rear outer portion 19 is folded upon the rear inner portion 22. As noted above, tabs 28 of floor portion 21 extend through the cut-outs 30 of rear inner wall portion 22 and then through cut-outs 29 of rear outer portion 19 to hold those portions together. Also, the tab members 36 on rear outer portion 19 pass through slots 37 formed between the inner rear wall portion 22 and side wall portion 17 to hold those portions together.

FIG. 4 illustrates the final steps to form the nesting box. The lid portion 20 is folded over the opening formed by the other portions with its tab members 39 engaging the slots 34, 35 of the sidewall members 17, 18. Although only one side wall portion 17 is illustrated, the same assembly is made for the other side wall portion 18.

The diameter of the entrance/exit hole 15 is preferably 28 mm, while the diameter of the hole 25 of the extension 24 is preferably 32 mm. As shown in FIG. 4, the cut-out members 14A, 14B can be selected for use in the adjustment, retention, or reinforcement of the diameter of the entrance/exit hole of the nesting box. This is achieved as shown in FIG. 5 by fastening flaps 40A, 40B into slots 41 located between the front portion 16 and side wall portions 17, 18 so that the cut-out members 14A, 14B are securely mounted on the nesting box.

As noted above, rear inner wall 22 includes horizontal cut-outs or slots 23 which act as internal surface devices that cooperate to form a "ladder", which helps not fully fledged offspring leave the nesting box. Also, the flaps 31 on the floor 21 of the nesting box, which help close the bottom of the nesting box, also act to reinforce the structure.

Finally, the floor 21 of the nesting box includes a perforated cut-out which forms a circle containing an -R- which is also perforated. The parts of the suspension system of the nesting box include the cut-out suspension holes, flaps, and the cut-outs and slots for fastening the portions together.

The nesting box is made of plastics, synthetic materials, cardboard/paper compositions, plant fibers and combinations thereof in sheets or fixed shapes. The nesting box is 100 to 1000 mm high, 100 to 1000 mm wide and 100 to 1000 mm deep.

A preferred embodiment of the nesting box is made of a hollow-structure sheet polypropylene HKP PP 2 mm, 600 g/square meters and is 260 mm high, 130 mm wide and 130 mm deep and weighs on the order of 250 g when it is folded and assembled.

Through FIGS. 1 to 5, the preferred design and forming of the nesting box are shown, but the nesting box can be formed as all known spatial figures and all combinations thereof, and the entrance and exit hole 15 of the nesting box can also be formed as all known shapes and all combinations thereof, and the location of the entrance and exit hole is not limited to a location on the top center part of the front of the nesting box.

Figure 7:
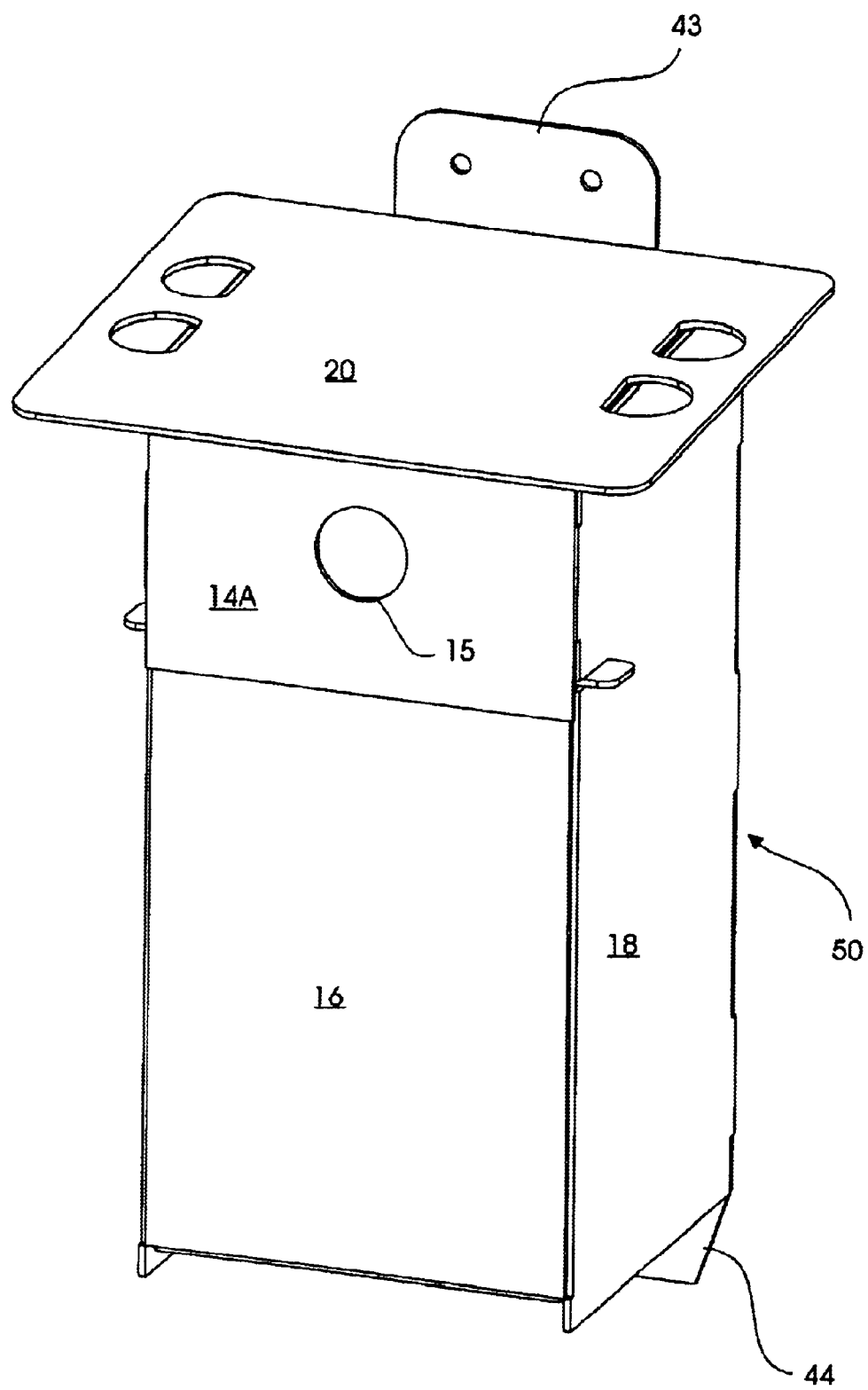

FIGS. 6 and 7 are front and perspective views, respectively of the final nesting box 50 that is assembled. Flaps 43 and 44 are provided on the rear of the nesting box for mounting on a wall or other flat vertical surface using screws or the like.

What is claimed is:

1. A punch-out sheet for use in making a bird nesting box without using tools or other aids, comprising:

interconnected outer and inner sheets, wherein the inner sheet includes a front portion, first and second side portions, an outer back portion, a lid portion and a floor portion, the portions having folding lines between them and including a plurality of slots and tabs formed on the various portions to enable the nesting box to be assembled, with the outer sheet including a carrier handle and one or several devices for preparing, adjusting and reinforcing an entrance and exit hole for the box, and with the inner sheet having an integral, at least dual, suspension system and a surface device that is arranged on an inner wall of the box when assembled and that assists fledglings in accessing the hole, and a transverse device in the form of a guard against predators for arrangement under the entrance and exit hole.

2. A punch-out sheet according to claim 1, wherein the surface device comprises a ladder which is arranged on a portion of the wall below the hole on an inner wall of the assembled box that is opposite the hole.

3. A nesting box-forming member comprising the punch-out sheet of claim 2.

4. A nesting box formed from the punch out sheet of claim 2.

5. A nesting box formed from the nesting box forming member of claim 3.

6. A punch-out sheet according to claim 1, which is made of a plastic, a synthetic material, cardboard, paper, plant fiber or a combination thereof.

7. A punch-out sheet according to claim 6, which is made of hollow-structure sheet polypropylene.

8. A nesting box-forming member comprising the punch-out sheet of claim 6.

9. A nesting box formed from the nesting box forming member of claim 8.

10. A nesting box formed from the punch out sheet of claim 6.

11. A nesting box formed from the punch out sheet of claim 7.

12. A nesting box-forming member comprising the punch-out sheet of claim 7.

13. A nesting box formed from the nesting box forming member of claim 12.

14. A nesting box-forming member comprising the punch-out sheet of claim 1.

15. A nesting box formed from the nesting box forming member of claim 14.

16. A nesting box formed from the punch out sheet of claim 1.

* * * * *

UNITED STATES PATENT AND TRADEMARK OFFICE
CERTIFICATE OF CORRECTION

PATENT NO.     : 6,637,373 B2
DATED          : October 28, 2003
INVENTOR(S)    : Rasmussen It is certified that error appears in the above-identified patent and that said Letters Patent is hereby corrected as shown below:

<u>Title page,</u>
Item [57], ABSTRACT,
Line 5, change "outersheet" to -- outer sheet --.

<u>Column 1,</u>
Line 60, delete "compsotions," and insert -- compositions --; and
Line 62, delete "howwow-structure" and insert -- hollow-structure --.

<u>Column 3,</u>
Line 45, after "includes tabs", delete "32" and insert -- 39 --.

Signed and Sealed this

Tenth Day of February, 2004

JON W. DUDAS
*Acting Director of the United States Patent and Trademark Office*